(12) United States Patent
Crosville et al.

(10) Patent No.: US 7,444,927 B1
(45) Date of Patent: Nov. 4, 2008

(54) BREWING MACHINE COMPRISING A DEVICE FOR REJECTION OF THE INFUSED PRODUCT

(75) Inventors: Vincent Crosville, Le Mesnil Villement (FR); Sylvain Giffard, Cambes en Plaine (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 11/706,271

(22) Filed: Feb. 15, 2007

(30) Foreign Application Priority Data

Mar. 1, 2006 (FR) .................................. 06 01836

(51) Int. Cl.
*A47J 31/00* (2006.01)
(52) U.S. Cl. ........................................ 99/295; 99/302 R
(58) Field of Classification Search ................... 99/275, 99/495, 279–307, 323, 516, 536
See application file for complete search history.

(56) References Cited

U.S. PATENT DOCUMENTS

| | | | | |
|---|---|---|---|---|
| 2,968,560 A | * | 1/1961 | Goros | ........................ 99/295 |
| 3,295,998 A | * | 1/1967 | Goros | ........................ 99/282 |
| 3,403,617 A | * | 10/1968 | Lampe | ........................ 99/295 |
| 3,470,812 A | * | 10/1969 | Levinson | ..................... 99/295 |
| 3,824,913 A | * | 7/1974 | Herman et al. | ................ 99/298 |
| 5,649,472 A | * | 7/1997 | Fond et al. | .................... 99/295 |
| 5,794,519 A | | 8/1998 | Fischer | |

FOREIGN PATENT DOCUMENTS

| | | |
|---|---|---|
| EP | 0151252 | 12/1984 |
| EP | 1050258 | 11/2000 |
| EP | 1331868 | 7/2004 |
| EP | 1486150 | 12/2004 |

\* cited by examiner

*Primary Examiner*—Timothy F. Simone
(74) *Attorney, Agent, or Firm*—Young & Thompson

(57) ABSTRACT

A brewing machine includes a brewing chamber delineated by first and second parts (12, 20) that can move relative to one another between closed and open positions, and a device for ejection of a portion of the infused product including an ejection element that can be moved by an actuating mechanism. A retractable flap is mounted to be able to move on the ejection element. The actuating mechanism moves the ejection element back from the chamber in the closed position, and during passage to the open position controls the forward motion of the ejection element parallel to the plane of the contact surface of the first and second parts, during which the flap is retracted upon contact with the portion, and a return movement during which the flap is in the holding position and drives the portion to outside of the brewing chamber.

20 Claims, 5 Drawing Sheets

US 7,444,927 B1

BREWING MACHINE COMPRISING A DEVICE FOR REJECTION OF THE INFUSED PRODUCT

FIELD OF THE INVENTION

This invention relates to a brewing machine, especially but not solely for preparation of coffee, which includes a device that is able to eject a portion of the infused product outside of the brewing chamber after preparation of the beverage.

BACKGROUND OF THE INVENTION

More especially, it relates to a brewing machine comprising the following, in a box:
- a brewing chamber delineated by a first part with a housing that receives a portion of the product to be brewed and a second part forming a cover, said first and second parts being movable relative to one another between a closed position for which they are integral with one another along a contact surface, and an open position for which they are spaced apart from one another; and
- a device for ejection of a portion of the infused product comprising an ejection element that can be moved by an actuating mechanism in a plane essentially parallel to the center plane of said contact surface.

The portion of the product to be brewed that is present in the form of a loose coffee grind, or a grind packed in a filter paper package or in the form of a solid capsule, engenders problems of handling by the user after the brewing operation, especially due to this portion being hot and wet after passage of the hot water. Thus, for brewing machines and especially espresso-type coffee machines, various devices have been suggested allowing ejection of a portion of the infused product to a receptacle of the machine without the user having to handle the portion.

For example, such an ejection device is known from EP-A-151 252, which describes a hook mounted to slide and partially surround the capsule of the product to be brewed. During the opening movement of the brewing chamber, the hook slides and ejects the capsule, then returns to its initial position. This ejection hook, however, has the disadvantage of being located in the immediate vicinity of the capsule during the brewing process. On the one hand, this engenders problems for ensuring a perfect seal of the chamber that accommodates the capsule due to the necessarily limited space between the hook and the capsule, and, on the other hand, it can disrupt the placement of the product portion in the brewing chamber, especially if a loose coffee grind is involved.

Other ejection devices implementing a more or less complex tipping movement of one part of the brewing chamber have likewise been proposed. These devices, however, are not entirely satisfactory, given that the tipping movement of one part of the chamber requires precision mechanisms and fittings to maintain the functions of sealing and channeling of the fluid of the brewing chamber. Moreover, the tipping part of the brewing chamber is implemented in the form of a relatively solid and bulky part, the tipping of which requires a relatively strong force and/or consideration of phenomena of inertia.

In completely automatic coffeemakers that use a grind or loose beans, there are also devices for automatic sweeping of the infused grind cake. The integration of such devices into these automatic machines with a large volume is relatively easy. Conversely, when it is desired to reduce the size of the machine and to obtain a relatively low production cost, these sweeping devices are not the most suitable.

SUMMARY OF THE INVENTION

The purpose of this invention is to provide an improved ejection device that avoids any handling of the infused product by the user, which affects the sealing characteristics of the brewing chamber and the kinematics of the opening system of the chamber as little as possible.

For this purpose, the object of this invention is a brewing machine of the aforementioned type, characterized in that the ejection device, moreover, comprises a retractable flap installed on the ejection element to be able to move between a retracted position in which it extends essentially against it, and a holding position for which it projects from said ejection element, and in that the actuating mechanism can move the ejection element back from the first and second parts of the chamber in the closed position, and can control it during passage from the closed position to the open position of the first and second parts of the brewing chamber:
- forward movement of the ejection element during which the flap moves into the retracted position upon contact with the portion and at the end of which said flap assumes a holding position by loss of contact with the portion; and
- return movement of the ejection element during which the flap in the holding position takes the portion to outside of the brewing chamber.

Due to the aforementioned characteristics of the ejection device, it does not interfere with the brewing chamber during the brewing operation, the first and second parts of the chamber being in the closed position. Thus, the tightness of the chamber is perfectly ensured. Moreover, the return motion of the ejection element takes the infused portion of the product from the same side as this element, for example towards a recovery tray located under this ejection element into the back position. This is advantageous when as much free space as possible around the brewing chamber is to be maintained.

In preferred embodiments of the invention, moreover, one or the other of the following devices can be used:
- the ejection element on the whole comes in the form of a plate mounted to slide horizontally and with a rear edge on which the retractable flap is mounted in an articulated manner;
- the first part of the brewing chamber comprises a piston mounted to slide between a brewing position for which it delineates the housing of said first part, and an ejection position from which it releases at least partially the infused product portion outside of said housing, at least during return motion of the ejection element; thus, due to the piston in the ejection position, holding of the infused portion by the flap and taking it to outside of the brewing chamber are greatly facilitated;
- the retractable flap has a length that is at least equal to the size of the portion of the infused product, measured perpendicular to the direction of motion of the ejection element, which allows good holding of the portion and prevents a fraction of the portion from remaining in the brewing chamber;
- the retractable flap along its free end has a central notch with preferably the profile of a continuous curve, which allows the flap to be retracted during forward motion of the ejection element as it comes gradually into contact with the portion of the infused product;
- the retractable flap is mounted to pivot freely on the ejection element, following a defined angular sector of the latter, and has a center of gravity arranged to allow the flap to move naturally into the holding position, said flap in the holding position resting essentially against one end of said angular sector of the ejection element; thus, the ejection device can be implemented with a smaller number of parts;

the ejection element comprises a projection with a reduced surface area and forming a stop for the flap when the latter assumes its retracted position, which avoids the phenomenon of the flap sticking in the retracted position;

the actuating mechanism of the ejection element can tension an elastic energy collection element during forward motion of the ejection element, the return motion of said ejection element being accomplished by the actuating mechanism solely under the action of release of the stored energy; this device makes it possible to adjust the force and speed of the return motion of the ejection element to predetermined values and to thus obtain constant ejection of the portion regardless of the force and speed with which the forward motion of the ejected element has been controlled;

passage of the first and second parts of the brewing chamber from the closed position to the open position is accomplished by manual movement of a handle, and the actuating mechanism includes a pivoting lever that has, on the one hand, a holding part with the ejection element so as to drive the forward and return motions of the latter, and, on the other hand, a stop with which a tab connected to the handle interacts such that the movement of the handle toward the open position of the brewing chamber drives the forward motion of the ejection element by pivoting said lever;

the stop of the pivoting lever is arranged to be released from the tab when the handle is near the open position, such that the lever accomplishes pivoting in the reverse direction under the action of the release of the energy storage element, said stop being retracted upon contact with the tab connected to the handle during movement of the latter from the open position into the closed position of the brewing chamber.

BRIEF DESCRIPTION OF THE DRAWINGS

Other characteristics and advantages of the invention will become apparent during the following description, given by way of a nonlimiting example, with reference to the drawings in which.

DETAILED DESCRIPTION OF THE PREFERRED EMBODIMENTS

In the various figures, identical references designate identical or similar elements.

Figure 1:
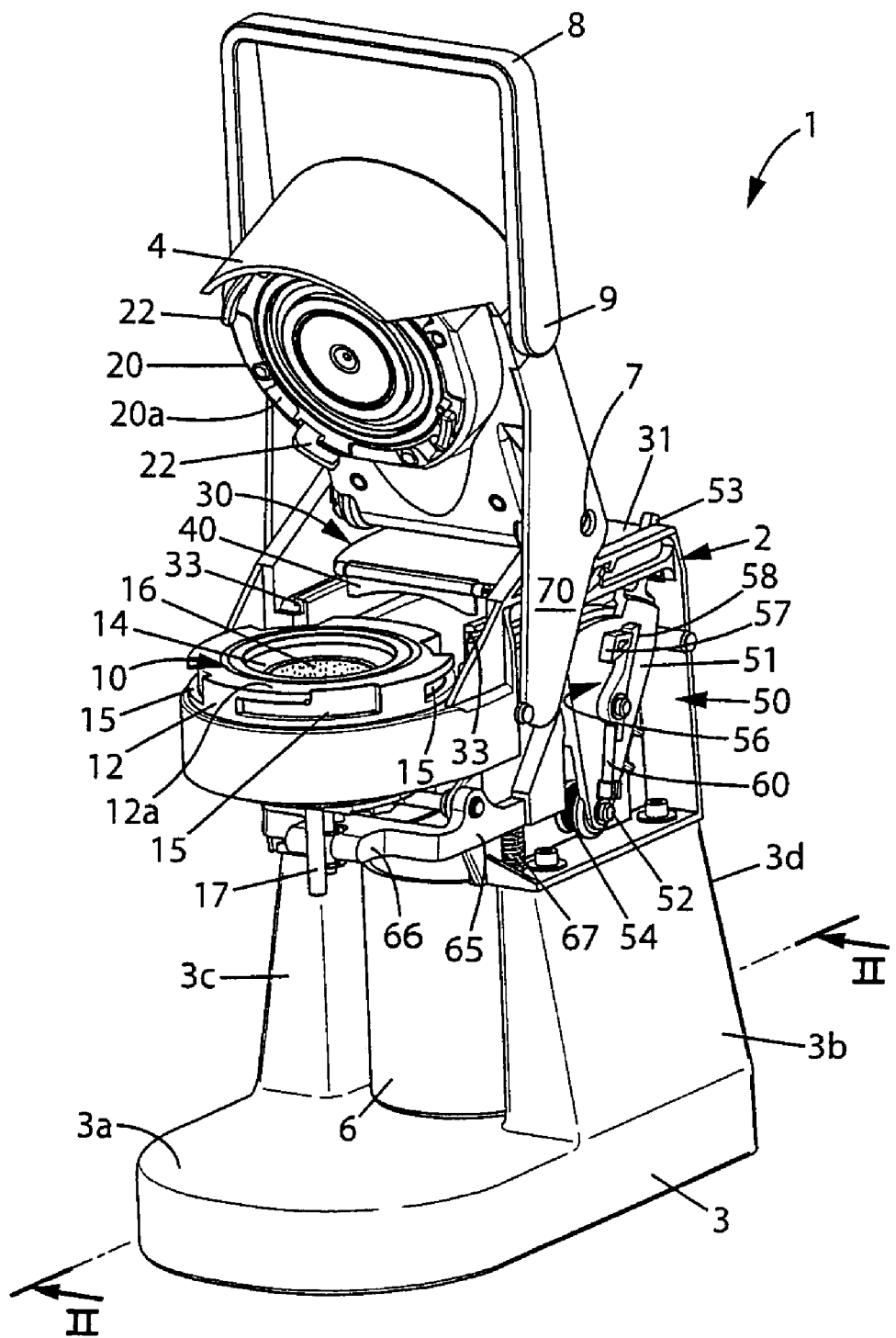
FIG. 1 is a partial, disassembled perspective representation of a brewing machine comprising an opening handle of the brewing chamber and an ejection device.

FIG. 1 shows a brewing machine 1, more especially a high- and low-pressure-type coffeemaker, i.e., comprising a pump, which is not shown, which supplies hot water under a pressure of two to fifteen bar.

The machine 1 comprises a box 2 formed by a base 3 and a cover 4. The base 3 of the box 2 in its front part has a support surface 3a that is designed to accommodate a coffee cup, side vertical uprights (3b, 3c) in which the technical components of the machine can be housed, such as, for example, the boiler, the pump, control electronics as well as the movement mechanisms that will be presented in detail below. The base 3 is extended from the rear surface 3d by a water tank and a support of this tank, not shown, such a support also being able to house the technical components of the machine.

Between the lateral uprights (3b, 3c) of the base 3 of the box, there is a receptacle 6 designed to receive portions of the infused product automatically, as described below.

Figure 2:
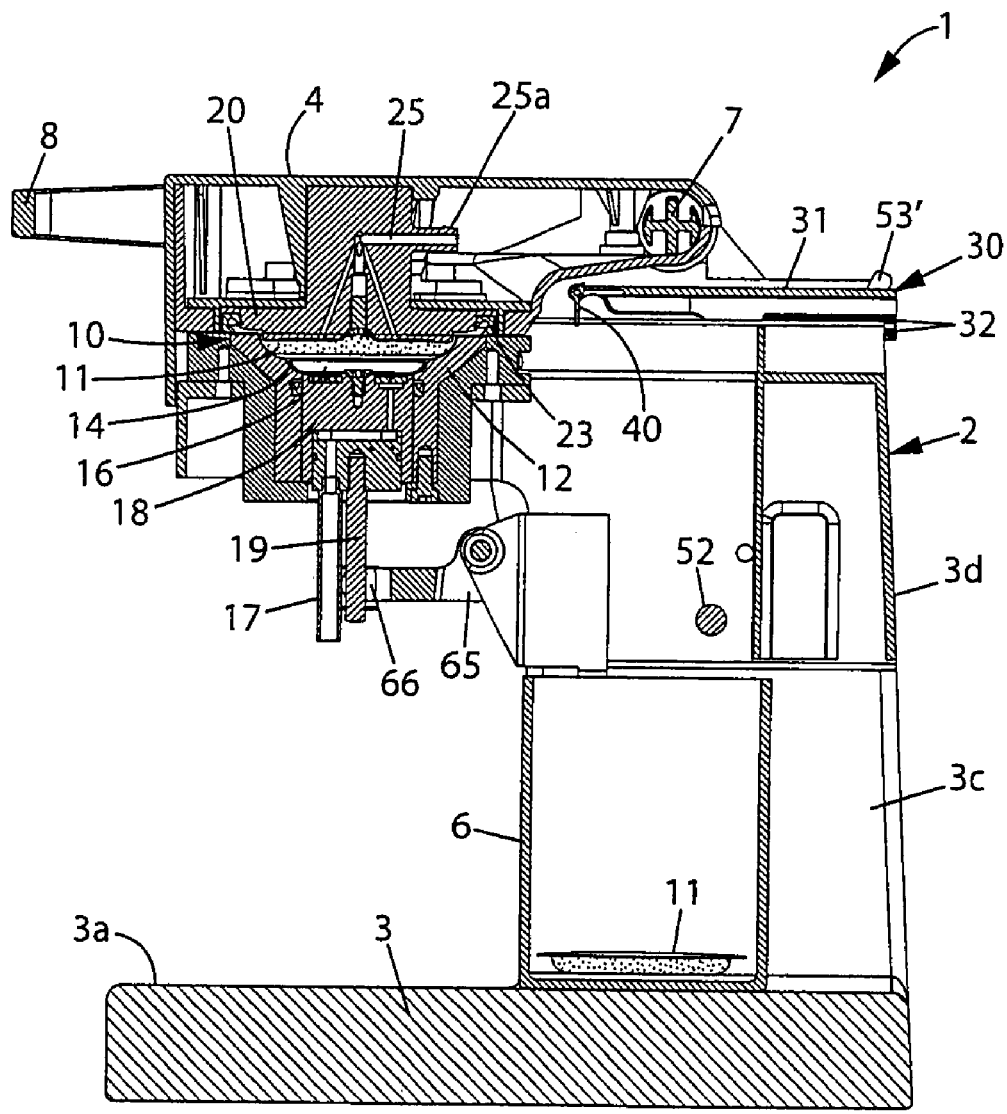
FIG. 2 is a simplified cutaway view along line II-II of FIG. 1, the handle being in the closed position.

In the embodiment shown in FIGS. 1 and 2, the receptacle 6 of the portions of the infused product is formed by an essentially cylindrical tube arranged stationary between the uprights (3b, 3c) so as to easily empty its contents.

The cover 4 of the box is mounted to be able to pivot around an axis 7 that is integral with the box 2. The cover 4 is provided with a handle 8 that allows it to be moved manually from a completely open position, shown in FIG. 1, to a closed position shown in FIG. 2, and vice versa. In this example, the handle 8 has a "U" shape and is mounted to be able to pivot relative to the cover 4 at the level of the pivoting points 9 located on the ends of the arms of the "U" so as to implement an angular displacement that is limited relative to the cover 4, a displacement that is more apparent between FIG. 2 and FIGS. 3 to 6. This angular displacement of the handle 8 is exploited to ensure locking of a brewing chamber 10. But, of course, it is quite possible to provide a handle 8 with a shape that is essentially different and integral with the cover 4.

The brewing chamber 10 is designed to receive a portion of the product to be brewed 11, shown in FIG. 2. In the embodiment shown, the portion of the product to be brewed 11 is composed of a slightly rounded package made of filter paper and containing the uncompacted coffee grind, called a single portion. The brewing chamber 10, however, can be modified to accommodate a product to be brewed with a different form, such as a rigid capsule, even in the form of a loose grind. The nature of the product to be brewed can likewise be different, such as, for example, tea, powdered milk, chocolate or a mixture of these products.

The brewing chamber 10 is delineated by a first part 12 that is integral with the base 3 of the box 2 and with a suitable housing 14 to hold the portion of product to be brewed 11. This first part 12 of the brewing chamber has a cylindrical periphery that is concentric to the housing 14, and that is provided with indentations 15 intended to ensure locking of the brewing chamber 10.

The first part 12 of the brewing chamber 10 has an essentially flat upper surface 12a (FIG. 1) that forms a contact surface with a second part 20 of the brewing chamber 10. The contact surface 12a defines a horizontal plane in the embodiment shown. It could simply be a more complex contact surface, however, with, for example, tiers, which could define a middle plane that is more or less inclined relative to the horizontal.

The first part 12 of the brewing chamber 10 comprises, in the known manner, a perforated bottom 16 that defines a space for collection of the infusion that is connected to the infusion outlet tube 17.

More particularly, in the embodiment shown in FIG. 2, the perforated bottom 16 and the outlet tube 17 are carried by a piston 18 mounted to slide vertically and tightly in the first part 12 of the brewing chamber. The piston 18 includes a rod 19 extending toward the bottom and connected to a driving mechanism, presented in detail below, allowing movement of the piston 18 between a brewing position for which it delineates the housing 14, and an ejection position for which it releases the portion 11 outside of the housing 14.

The second part 20 of the brewing chamber 10 is connected to the cover 4 of the box 2 and can thus move relative to the first part 12. This second part 20 of the brewing chamber has an essentially flat lower surface 20a (FIG. 1) and a cylindrical periphery that is provided with hooks 22 that are designed to engage the indentations 15 to ensure locking of the brewing chamber 10. More especially, the hooks 22 are driven in rotation by a bevel gear connected to the pivoting points 9 of the handle 8 such that when the cover 4 is lowered into the closed position, the hooks 22 penetrate the indentations 15, then pivot under the action of the angular displacement of the handle 8. This yields the closed position of the brewing chamber in which the two parts (12, 20) of said chamber 10 are integral with one another and in tight contact via the contact surface 12a of the first part 12 with the corresponding position of the lower surface 20a of the second part 20. A flexible joint 23 (FIG. 2) is arranged on the lower surface 20a of the second part 20 to improve this tightness.

When the brewing chamber 10 is in the closed position, as illustrated in FIG. 2, the brewing operation is implemented by feeding, via an internal tube 25, the second part 20 that is connected on its outer end 25a to a flexible tube, not shown, connected to a pump and a boiler.

The coffeemaker 1 likewise comprises an ejection device 30 that is adapted to automatically eject the portion of the infused product 11 during movement from the closed position to the open position of the brewing chamber 10.

The ejection device 30 comprises an ejection element 31 that can be moved by an actuating mechanism 50, one embodiment of which will be presented in detail below. The actuating mechanism 50 is able, on the one hand, to move the ejection element 31 back from the first 12 and second 20 parts of the brewing chamber 10 into the closed position as shown in FIG. 2, and, on the other hand, during passage from the closed position to the full open position of the brewing chamber 10, or at least during part of this passage, to control the forward motion (arrow F1, FIG. 3) of the ejection element 31 from the back position shown in FIG. 2 to the full forward position toward the front surface shown in FIG. 4, and the return motion of the ejection element 31 (arrow F2, FIG. 5).

Figure 7:
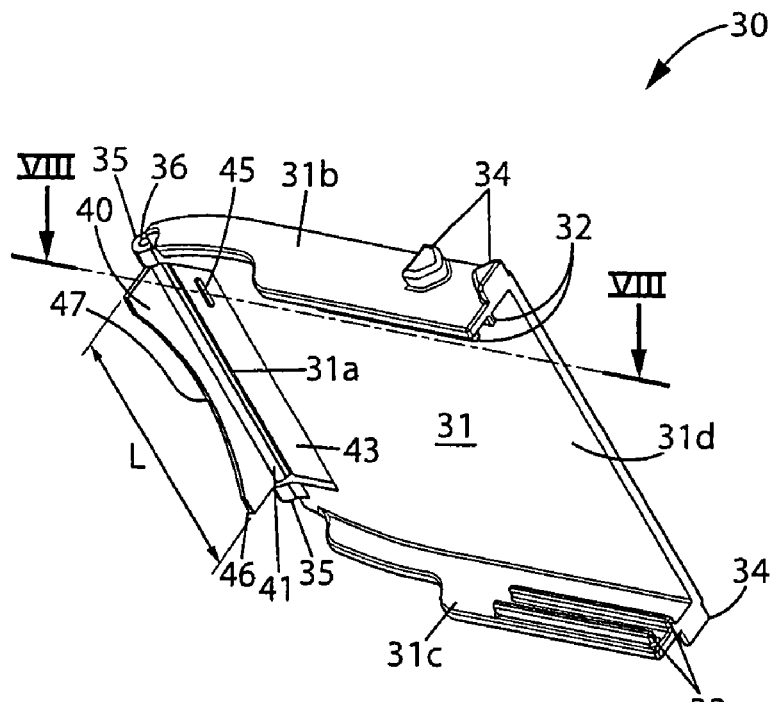
FIG. 7 is a bottom perspective view of the ejection device of the machine shown in FIG. 1, comprising a retractable flap in the holding position.
Figure 8:
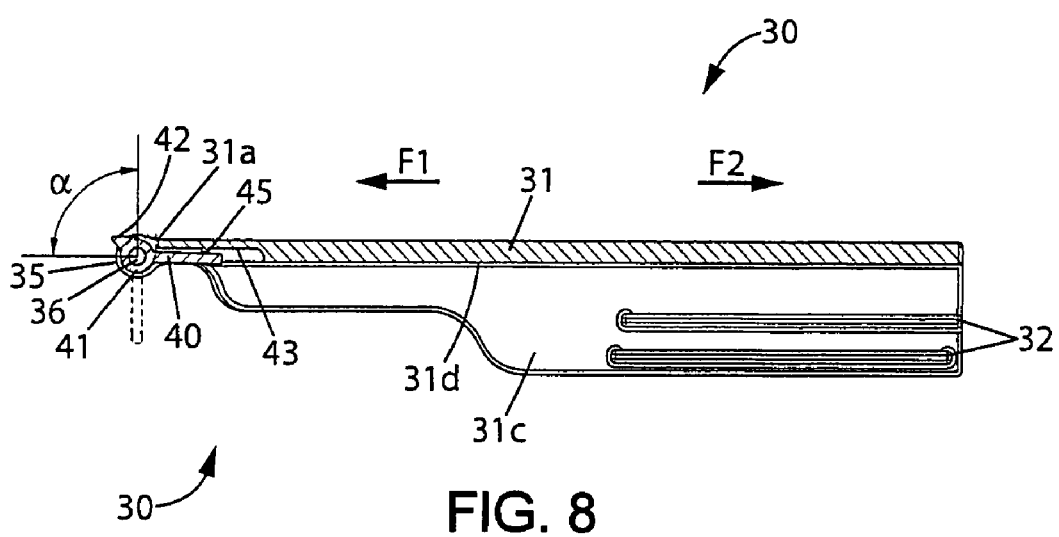
FIG. 8 is a cutaway view along line VIII-VIII of FIG. 7, the flap being in the retracted position.

The ejection element 31, shown better in FIGS. 7 and 8, on the whole has the form of a plate with a forward edge 31a (FIG. 8) located next to the front surface of the machine 1, and side edges formed by flanks (31b, 31c) extending toward the bottom. The flanks (31b, 31c) each have two ribs 32 extending parallel to the plane of the plate 31 on their inner surface. Each pair of ribs 32 interacts with an additional rib 33 (FIG. 1) formed in the base 3 of the box 2. The ribs 33 of the box 2 are arranged to guide the sliding of the ejection element 31 in an alternative movement of horizontal translation. On the other hand, each side flank (31b, 31c) comprises on its outer surface a pair of catches 34 forming a fork that engages the actuating mechanism 50 and by which movement of the ejection element 31 is positively controlled.

The alternative translational movement, or forward F1 and return F2 movements, is oriented radially relative to the brewing chamber 10 and is included in a plane parallel to the center plane defined by the contact surface 12a of the first part 12 of this chamber. This alternative movement is accomplished above this contact surface 12a such that the ejection element 31 comes to rest neither in the first part 12 of the chamber nor in the portion of the product to be brewed 11 during forward motion when it overlaps the housing 14. It is preferable, however, that the ejection element 31 not be located at an excessive distance above the first part 12 of the brewing chamber.

It would seem obvious that the implementation, guidance, and driving of the ejection element 31 can take different forms. By way of example, the ejection element could take the form of a pivoting mounted arm driven by gearing from the time at which this element can move back and forth as described above.

In the embodiment shown in FIGS. 7 and 8, the ejection element 31 on the ends of its forward edge 31a has brackets 35 bearing an axis 36 extending parallel to this forward edge 31a. A retractable flap 40 is mounted to be able to move around this axis 36 between the retracted position, shown in FIGS. 3 and 8, in which it extends essentially against the lower surface 31d of this element 31, and the so-called holding position, shown in FIGS. 1, 2, 4, 5, and 7, for which it projects relative to the ejection element 31. In the illustrated embodiment, the holding position that can be assumed by the flap 40 corresponds to the position for which the flap 40 extends essentially perpendicular to the plane of the ejection element 31 and toward the bottom relative to the latter. Thus, the vertical obstruction of the flap 40 is dramatically reduced when it moves from its holding position to its retracted position.

As is shown in FIGS. 7 and 8, the flap 40 is mounted articulated on the ejection element 31 via a tubular part 41 extending along the edge of the flap adjacent to the ejection element and surrounding the axis 36 of the latter. Thus, the flap 40 can pivot freely and, of course, under the influence of gravity assumes the holding position shown by the broken line in FIG. 8, given that its center of gravity is shifted relative to the axis 36.

The angular displacement of the flap 40, however, is limited to an angle $\alpha$ of roughly 90 degrees, as shown in FIG. 8, due to its contact with the lower surface 31d of the ejection element 31 when it is in the retracted position, and due to the contact of a stop 42 that is integral with the flap 40 with the forward edge 31a of the ejection element. Consequently, with reference to FIG. 8, when the ejection element 31 executes the return motion shown by the arrow F2, the flap cannot turn clockwise beyond its holding position shown by the broken line, especially when it comes into contact with the portion of infused product 11. The installation of the flap 40 accomplished in this way is especially simple, but, of course, the flap 40 could be mounted to be able to move relative to the ejection element 31 in another way, for example by a plastic hinge. Elastic means can be likewise provided, for example to return the flap to the holding position.

The ejection element 31, FIGS. 7 and 8, on its lower surface 31d has a depression 43 that covers the length of the zone opposite which the flap in the retracted position is located. Thus, in this retracted position, the height occupied by the flap 40 and the front part of the plate 31 forming the ejection element is essentially equal to the height of the remainder of this plate, thus making the assembly less bulky.

As is best shown in FIGS. 7 and 8, the depression 43 of the ejection element 31 comprises a projection 45 of reduced cross-section and low height. The projection 45 forms a contact surface between the ejection element 31 and the flap 40 in the retracted position that is very reduced, and in any case much smaller than the surface of the flap. This makes it possible to avoid the phenomenon of the flap 40 sticking in the retracted position against the ejection element 31, and this sticking can be caused when the depression 43 is wetted by drops of water falling from the second part 20 of the brewing chamber. As will become apparent below, it is important to prevent this sticking for the ejection element to be reliable. Of course, the function of the projection 45 of the embodiment shown can be implemented in an equivalent manner by a projection that is integral with the flap 40 and arranged to come into contact with the ejection element 31 for the retracted position of the flap 40.

The actuating mechanism 50 of the ejection element 31 comprises, as shown in FIGS. 3 to 6, a pivoting lever 51 mounted on an axis 52 that is stationary relative to the base 3 of the box. The lever 51 extends from this axis 52 in the form of an angular sector and is lengthened by a pin 53 that engages between the pair of catches 34 of the ejection element 31, such that any pivoting of the lever 51 drives a translational movement corresponding to the ejection element 31. An identical pivoting lever, of which the pin 53' is shown in FIG. 2, is provided in the opposite side upright 3c of the base of the box 2 and is driven with the lever 51 via the axis 52 in order to apply symmetrical forces to the ejection element 31.

Figure 6:
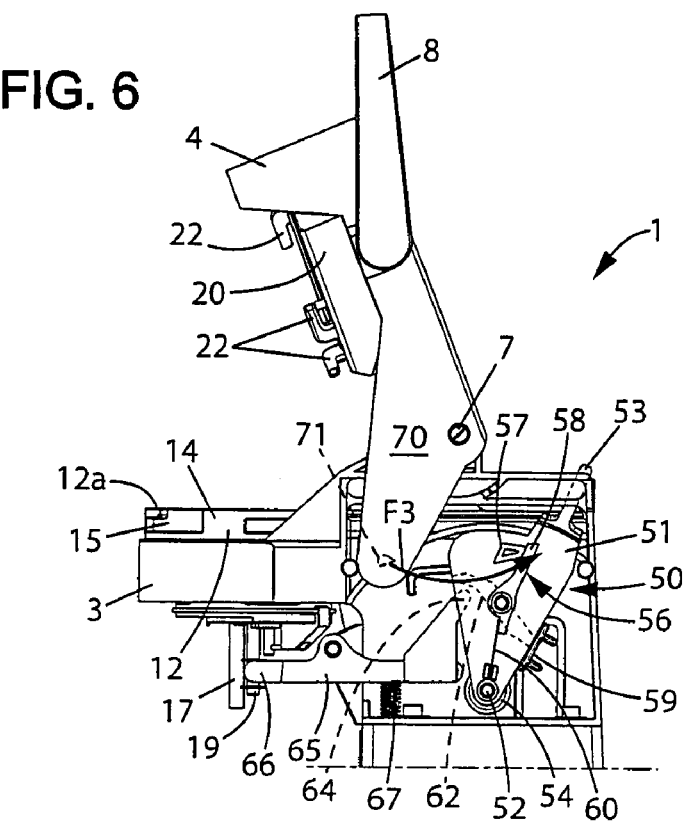
FIG. 6 is a view similar to FIG. 3, in which the handle is in the open position.

The pivoting lever 51 is provided with an elastic energy storage element 54, shown in FIG. 1, which is implemented here in the form of a torsion spring surrounding the axis 52, of which one of its ends is held by the base 3 of the box, and of which the other end is held by the pivoting lever 51. The elastic element 54 is arranged so as to constantly pull the pivoting lever 51 toward the back surface 3d of the box such that the lever 51 naturally assumes the initial position shown in FIGS. 1 and 6, for which it is supported against a stop 59 (FIG. 6). It should be noted that when the lever 51 is pivoted toward the front surface of the machine to reach the position shown in FIG. 4, the elastic element 54 stores a defined amount of additional energy and the return force toward the rear position of the lever 51 then reaches an essentially constant maximum value regardless of the speed or the force with which the lever 51 has been pivoted.

The pivoting lever 51 comprises a retractable stop 56 arranged on its outer surface and likewise shown in FIG. 1. The retractable stop 56 comprises a stud 57 that is integral with the lever 51, a lug 58 mounted to pivot around one axis relative to the lever 51, and an elastic strip 60 driving the lug against the stud 57. On the inside surface of the pivoting lever 51, a cam path 62 is formed that interacts with a cam 64 that is formed on the end of a rocker 65, the other end 66 of the rocker being engaged by the rod 19 of the piston 18. Action on the cam 64 compresses a spring 67 that is located under the rocker 65, which makes it possible to return the piston 18 to the lowered position, i.e., the brewing position.

The cover 4 of the box 2 is extended by a tab 70 extending to within the base 3, its being understood that the lateral upright 3b of the box is closed by a plate that is not shown in FIG. 1. The tab 70 is moved at the same time as the cover 4 when the user moves the handle 8. The tab 70 interacts with the actuating mechanism 50 via a catch 71 that is integral with the latter and that projects on its internal surface. More especially, the catch 71 of the tab 70 can interact with the retractable stop 56 of the lever 51 during a part of the movement, then can disengage from this stop 56, and finally can move the lug 58 of the retractable stop aside to again engage the latter from the side opposite the stud 57, as will be explained below in the course of the description of an automatic sequence of ejection of a portion of infused product.

After a brewing operation, here the preparation of coffee, the brewing chamber 10 is in the closed position, as shown in FIG. 2. It should be noted that in this position, the cover 4 is likewise in the closed position and that the ejection element 30 is in the recoiled position with the retractable flap 40 in the holding position and located above the receptacle of the portions of infused product 6.

Proceeding from this position, the user applies a force upward to the handle 8, which drives angular movement of the handle 8 relative to the cover 4 and unlocking of the chamber 10 by rotary disengagement of the hooks 22 from their pertinent indentations 15.

Continuing the force upward, the user causes pivoting of the cover 4 around its axis 7, and accordingly the corresponding pivoting of the tab 70. The tab 70 then acts via its catch 71 on the retractable stop 56, and more exactly on the lug 58 of this stop that is supported against the stud 57 of the pivoting lever 51. The lever 51 thus pivots counterclockwise in the figures, due to its interaction by contact with the tab 70 connected to the handle 8, to reach the first intermediate position shown in FIG. 3.

During the pivoting of the lever 51, the cam track 62 of the lever 51 comes into contact with the cam 64 of the rocker 65, which causes the piston 18 to be raised toward the ejection position, and consequently a release of the portion of the product to be brewed 11 from the housing 14 of the first part 12 of the chamber 10. At the same time, the ejection element 31 driven by the pin 53 of the lever 51 executes a horizontal forward motion, shown by the arrow F1 in FIG. 3, in the direction of the front surface of the machine and partially overlapping at this instant the housing 14 of the brewing chamber. The retractable flap 40 then comes into contact with the portion of infused product 11 and is moved by the latter toward its retracted position due to its being mounted to pivot freely.

It should be noted that the flap 40 has a free edge 46, shown in FIG. 7, opposite the edge adjacent to the ejection element 31. The free edge 46 in its center has an arc-shaped recess 47 that allows it to make gradual contact with the portion of the product 11 during forward motion F1. Actually, the portion of product 11 generally has a slightly bulging profile and a thin peripheral ruffle. Due to its recess 47, the flap 40 first comes into contact with two points of the ruffle of the portion that are spaced apart and in one direction forming an acute angle with the latter. Then, the tip of the recess 47 of the flap comes into contact with the tip of the bulging portion 11, but the flap 40 is then already essentially inclined relative to the horizontal. Thus, the passage to the retracted position of the flap 40 is facilitated and there is no risk that the portion 11 will be pushed toward the front surface of the machine during forward motion of the ejection element 31.

Figure 3:
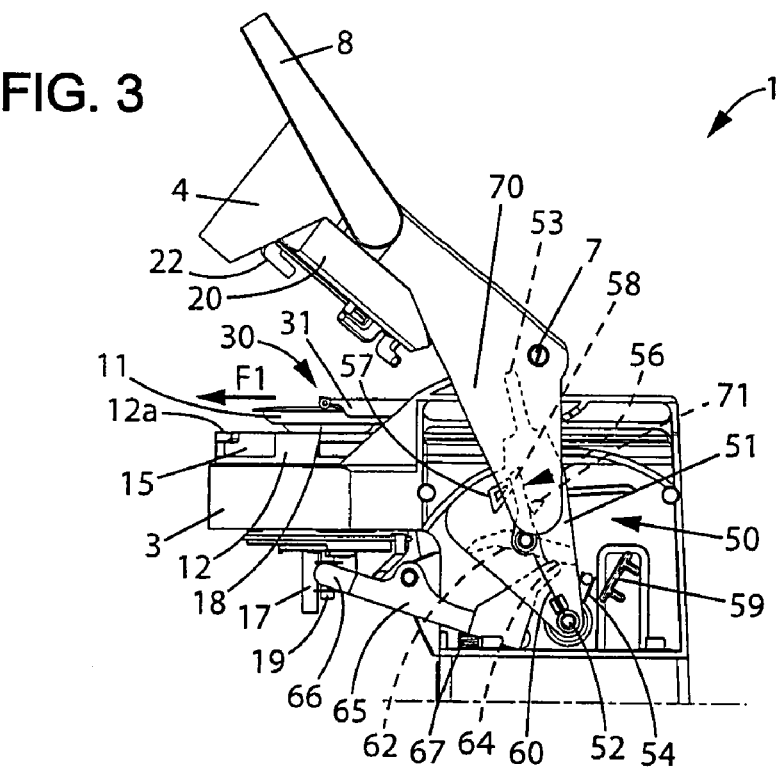
FIG. 3 is a partial side view of the machine shown in FIG. 1, the handle being in the first intermediate position between the open and closed positions.
Figure 4:
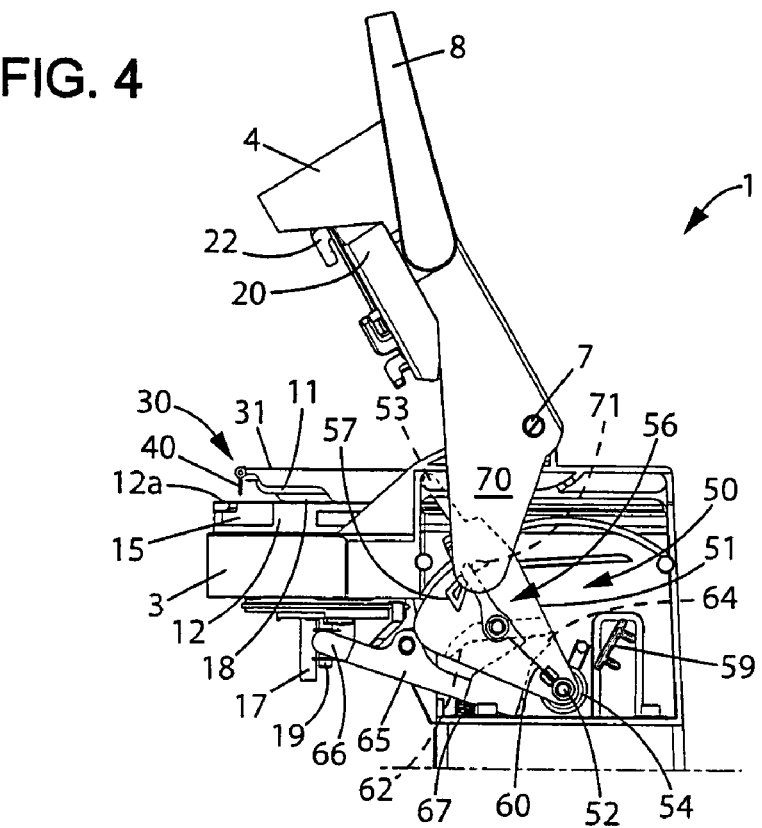
FIG. 4 is a view similar to FIG. 3, in which the handle is in a second intermediate position between the open and closed positions.
Figure 5:
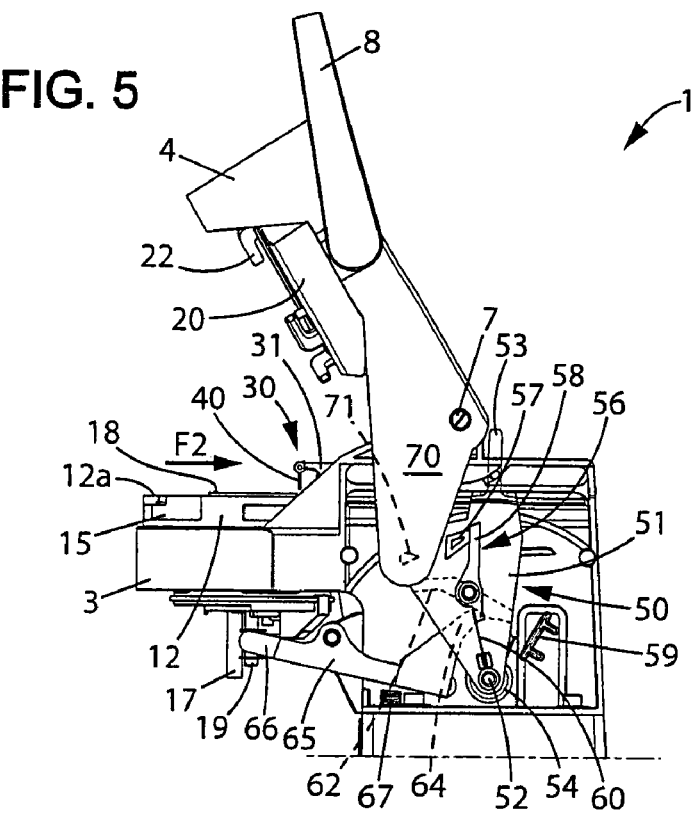
FIG. 5 is a view similar to FIG. 3, in which the handle is in a third intermediate position between the closed and open positions.

The forward motion of the ejection element 31 continues from the position shown in FIG. 3 to reach the full forward position shown in FIG. 4, without moving the portion of the product 11 due to retraction of the flap 40. In the configuration shown in FIG. 4, the cover 4 is in the second intermediate position, but it has not yet reached the maximum open position of the brewing chamber 10. Slightly before reaching this position, the retractable flap 40 loses contact with the portion of the product 11, and sooner, the deeper the recess 47, given the circular shape of the portion of product 11. The flap 40 then takes its holding position under the influence of its own weight, as shown in FIG. 4. It should likewise be noted that in this position, the piston 18 is always in the ejection position due to the profile selected for the cam path 62 of the lever 51.

The catch 71 of the tab 70 slides along the retractable catch 56 and ends up in the vicinity of the end of the latter in the full advanced position.

Continuing a small amount of action on the handle 8, the catch 71 of the tab 70 is released from the retractable stop 56 of the lever 51. The lever 51 then pivots clockwise under the action of the elastic energy storage element 54, and via its pin 53 drives the ejection element 31 in horizontal return motion during which the mechanism instantaneously assumes the configuration shown in F1G. 5. During this return motion shown by the arrow F2, the retractable flap 40 remains in the holding position due to its limited angular displacement and then drives the portion of the product 11 toward the rear surface 3d of the machine, which causes the portion to drop into the receptacle 6.

It should be noted that the dimensions of the retractable flap 40 are adapted to ensure close engagement with the portion of the product 1; this is possible especially due to the retracted position of the flap 40 and the recoiled position of the ejection device 30 during the brewing operation. Preferably, the flap 40 (FIG. 7) has a length L measured along the forward edge 31a of the ejection element 31, which is equal to the size of the portion of product 11 measured perpendicular to the direction of movement of the ejection element 31 and parallel to the plane of the contact surface 12a of the first part 12 of the brewing chamber 10.

At the end of the return motion of the ejection element 31, the lever 51 again assumes its initial position shown in FIG. 6 by making contact against the stop 59, i.e., in the position identical to that obtained when the brewing chamber 10 is in the closed position as shown in FIG. 2. The cover 4, however, is then in the maximum opened position and the tab 70 itself does not interact any longer with the retractable stop 56 of the lever 51. To allow return to the closed position of the cover 4, the stud 57 and the lug 58 are arranged relative to the path followed by the catch 71 indicated by the arrow F3 in FIG. 6, such that the latter drives clockwise pivoting of the lug 58 and passes to the right of the latter for the configuration shown in FIG. 6. The opening cycle that includes automatic ejection of the portion of infused product can then be started again.

The embodiment described above is not at all limiting, and various modifications can be made without departing from the framework of this invention. It should be noted that the actuating mechanism can be implemented differently, once it is able to drive forward and return movements of the ejection element. It could be, for example, gears or catches operating along grooves. Sometimes, the fact of resorting to interactions by contact between parts offers the advantage of a major possibility of adaption of the laws of kinematics of the parts and ensures reliable operation in spite of phenomena of wear or variance of the dimensions of the parts, given that simple springs make it possible to compensate for possible play.

Moreover, the described embodiment uses manual driving for automatic forward motion and return motion adjusted by an energy storage means. It is quite conceivable to provide for the return motion to be controlled manually, or again for the operating assembly of the actuating mechanism to be automatic for example using an electric motor or hydraulic jack to control at least the forward motion of the ejection element.

The invention claimed is:

1. Brewing machine comprising the following in a box:
 a brewing chamber delineated by a first part with a housing that receives a portion of a product to be brewed and a second part forming a cover, said first and second parts being movable relative to one another between a closed position for which they are integral with one another along a contact surface and an open position for which they are spaced apart from one another; and
 a device for ejection of a portion of the product after infusion comprising an ejection element that can be moved by an actuating mechanism in a plane essentially parallel to a center plane of said contact surface,
wherein the ejection device also comprises a retractable flap that is installed to be able to move on the ejection element between a retracted position in which the flap extends essentially against the ejection element, and a holding position for which the flap projects from said ejection element; and
 Wherein the actuating mechanism can move the ejection element back from the first and second parts of the chamber in the closed position, and can control the ejection element during passage from the closed position to the open position of the first and second parts of the brewing chamber:
 forward movement of the ejection element during which the flap moves into the retracted position upon contact with the portion and at the end of which said flap assumes a holding position by loss of contact with the portion; and
 return movement of the ejection element during which the flap in the holding position drives the portion to outside of the brewing chamber.

2. Machine according to claim 1, wherein the ejection element is present on a whole in a form of a plate mounted to slide horizontally, with a rear edge on which the retractable flap is mounted in an articulated manner.

3. Machine according to claim 1, wherein the first part of the brewing chamber comprises a piston mounted to slide between a brewing position for which it delineates the housing of said first part, and an ejection position from which it releases at least partially the portion after infusion outside of said housing, at least during return motion of the ejection element.

4. Machine according to claim 1, wherein the retractable flap has a length that is at least equal to the size of the portion after infusion, measured perpendicular to the direction of motion of the ejection element.

5. Machine according to claim 1, wherein the retractable flap along its free end has a central recess with a profile of a continuous curve.

6. Machine according to claim 1, wherein the retractable flap is mounted to pivot freely on the ejection element, following a defined angular sector of the latter, and has a center of gravity arranged to allow the flap to move naturally into the holding position, said flap in the holding position resting essentially against one end of said angular sector of the ejection element.

7. Machine according to claim 1, wherein the ejection element comprises a projection with a reduced surface area, forming a stop for the flap when the latter assumes its retracted position.

8. Machine according to claim 1, wherein the actuating mechanism of the ejection element can tension an elastic energy collection element during forward motion of the ejection element, the return motion of said ejection element being accomplished by the actuating mechanism solely under the action of release of the stored energy.

9. Machine according to claim 1, wherein passage of the first and second parts of the brewing chamber from the closed position to the open position is accomplished by manual movement of a handle, and the actuating mechanism includes a pivoting lever that has, on the one hand, a holding part with the ejection element so as to drive the forward and return motions of the latter, and, on the other hand, a stop with which a tab connected to the handle interacts such that the movement of the handle toward the open position of the brewing chamber drives the forward motion of the ejection element by pivoting said lever.

10. Machine according to claim 8, wherein the stop of the pivoting lever is arranged to be released from the tab when the handle is near the open position such that the lever accomplishes pivoting in the reverse direction under the action of the release of the energy storage element, said stop being retractable upon contact with the tab connected to the handle during the movement of the latter from the open position to the closed position of the brewing chamber.

11. Machine according to claim 2, wherein the first part of the brewing chamber comprises a piston mounted to slide between a brewing position for which it delineates the housing of said first part, and an ejection position from which it releases at least partially the portion after infusion outside of said housing, at least during return motion of the ejection element.

12. Machine according to claim 2, wherein the retractable flap has a length that is at least equal to a size of the portion after infusion, measured perpendicular to the direction of motion of the ejection element.

13. Machine according to claim 3, wherein the retractable flap has a length that is at least equal to a size of the portion, measured perpendicular to the direction of motion of the ejection element.

14. Machine according to claim 2, wherein the retractable flap along its free end has a central recess with a profile of a continuous curve.

15. Machine according to claim 3, wherein the retractable flap along its free end has a central recess with a profile of a continuous curve.

16. Machine according to claim 4, wherein the retractable flap along its free end has a central recess with a profile of a continuous curve.

17. Machine according to claim 2, wherein the retractable flap is mounted to pivot freely on the ejection element, following a defined angular sector of the latter, and has a center of gravity arranged to allow the flap to move naturally into the holding position, said flap in the holding position resting essentially against one end of said angular sector of the ejection element.

18. Machine according to claim 3, wherein the retractable flap is mounted to pivot freely on the ejection element, following a defined angular sector of the latter, and has a center of gravity arranged to allow the flap to move naturally into the holding position, said flap in the holding position resting essentially against one end of said angular sector of the ejection element.

19. Machine according to claim 4, wherein the retractable flap is mounted to pivot freely on the ejection element, following a defined angular sector of the latter, and has a center of gravity arranged to allow the flap to move naturally into the holding position, said flap in the holding position resting essentially against one end of said angular sector of the ejection element.

20. Machine according to claim 5, wherein the retractable flap is mounted to pivot freely on the ejection element, following a defined angular sector of the latter, and has a center of gravity arranged to allow the flap to move naturally into the holding position, said flap in the holding position resting essentially against one end of said angular sector of the ejection element.

* * * * *